(12) United States Patent
Gurkan et al.

(10) Patent No.: US 9,787,586 B2
(45) Date of Patent: Oct. 10, 2017

(54) LOCATION-BASED NETWORK ROUTING

(71) Applicant: University of Houston System, Houston, TX (US)

(72) Inventors: Deniz Gurkan, Pearland, TX (US); Bahaa Araji, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 130 days.

(21) Appl. No.: 14/523,364

(22) Filed: Oct. 24, 2014

(65) Prior Publication Data

US 2015/0117458 A1 Apr. 30, 2015

Related U.S. Application Data

(60) Provisional application No. 61/894,962, filed on Oct. 24, 2013.

(51) Int. Cl.
| | |
|---|---|
| *H04L 12/721* | (2013.01) |
| *H04L 12/947* | (2013.01) |
| *H04L 12/743* | (2013.01) |
| *H04L 12/741* | (2013.01) |

(52) U.S. Cl.
CPC ............ *H04L 45/72* (2013.01); *H04L 45/74* (2013.01); *H04L 49/25* (2013.01); *H04L 45/7457* (2013.01)

(58) Field of Classification Search
CPC ..... H04L 45/72; H04L 45/74; H04L 45/7457; H04L 49/25
See application file for complete search history.

(56) References Cited

U.S. PATENT DOCUMENTS

| | | | | |
|---|---|---|---|---|
| 6,438,129 B1* | 8/2002 | Jennings | ........... | H04L 29/12009 370/389 |
| 7,499,450 B2* | 3/2009 | Foglar | ..................... | H04L 45/60 370/392 |
| 8,724,638 B1* | 5/2014 | Carrie | ................. | H04L 12/4641 370/395.53 |
| 9,319,335 B1* | 4/2016 | Tripathi | .............. | H04L 12/4641 |
| 2005/0281196 A1* | 12/2005 | Tornetta | .................. | H04L 45/00 370/235 |

(Continued)

OTHER PUBLICATIONS

International Patent Application No. PCT/US2014/062207 International Search Report and Written Opinion dated Jan. 26, 2015 (10 pages).

*Primary Examiner* — Parth Patel
*Assistant Examiner* — Kai Chang
(74) *Attorney, Agent, or Firm* — Conley Rose, P.C.

(57) ABSTRACT

Apparatus and method for routing packets in a computer network. A network switch for routing packets in a computer network includes a plurality of ports for communicative connection of computing devices to the switch, and routing logic. The routing logic is configured to extract, from a packet received via a first of the ports, a destination address that identifies a destination device to which the packet is directed; to extract from the destination address a switch ID value and a port ID value; to compare the switch ID value extracted from the destination address to a switch ID value identifying the network switch; and to transmit the packet via a second of the ports of the network switch corresponding to the port ID value based on the switch ID value extracted from the destination address being equal to the switch ID value identifying the network switch.

20 Claims, 6 Drawing Sheets

(56) References Cited

U.S. PATENT DOCUMENTS

| | | | |
|---|---|---|---|
| 2008/0002976 A1 | 1/2008 | Tal et al. | |
| 2009/0113043 A1* | 4/2009 | Suizo | H04L 41/08 709/224 |
| 2009/0285223 A1 | 11/2009 | Thomas | |
| 2011/0064083 A1* | 3/2011 | Borkenhagen | H04L 45/02 370/392 |
| 2012/0195308 A1* | 8/2012 | Shiraki | H04L 12/433 370/389 |
| 2012/0257608 A1* | 10/2012 | Masputra | H04L 45/00 370/338 |
| 2012/0263186 A1 | 10/2012 | Ueno | |
| 2012/0320921 A1 | 12/2012 | Barnes et al. | |
| 2013/0010600 A1* | 1/2013 | Jocha | H04L 43/026 370/236.2 |
| 2013/0034095 A1* | 2/2013 | Miyazaki | H04L 45/74 370/389 |
| 2013/0055010 A1* | 2/2013 | Kotha | G06F 11/203 714/4.11 |
| 2013/0097335 A1* | 4/2013 | Jiang | H04L 61/2528 709/245 |
| 2013/0208621 A1* | 8/2013 | Manghirmalani | H04L 45/44 370/254 |
| 2013/0276135 A1* | 10/2013 | Conklin | G06F 21/554 726/27 |
| 2014/0047125 A1* | 2/2014 | Hyoudou | H04L 45/021 709/232 |
| 2014/0241367 A1* | 8/2014 | Ichino | H04L 45/02 370/392 |
| 2014/0301397 A1* | 10/2014 | Zhou | H04L 49/3009 370/392 |
| 2015/0071292 A1* | 3/2015 | Tripathi | H04L 45/66 370/392 |

* cited by examiner

LOCATION-BASED NETWORK ROUTING

CROSS-REFERENCE TO RELATED APPLICATIONS

This application claims the benefit of U.S. provisional patent application Ser. No. 61/894,962 filed Oct. 24, 2013, and entitled "Location-Based Network Routing," which is hereby incorporated by reference in its entirety for all purposes.

BACKGROUND

Early computer networks communicatively connected a small number of devices via cables. In contrast, modern computer networks may connect thousands of devices spread across large local areas, with the local area networks in turn being connected to form still larger networks such as, for example, the Internet.

Ethernet is the predominate standard applied to construct and access modern computer networks. Ethernet is promulgated by the Institute of Electrical and Electronics Engineers (IEEE) in various specifications as part of the IEEE 802 family of standards. Ethernet defines a number of wiring and signaling standards for the lower layers of the network. Ethernet networks carry all kinds of traffic over multiple types of physical connections (wired or wireless), including 10 mega-bits per second (Mbps), 100 Mbps, 1 giga-bits per second (Gbps), 10 Gbps, and 100 Gbps connections.

Internet Protocol (IP) is a computer network protocol that most networked devices apply on top of the lower level protocols (e.g., Ethernet protocols). The vast majority of networked devices support IP version 4 (IPv4) defined in RFC-791. IPv4 provides a 32 bit address field for each of the source and destination of a packet. IP version 6 (IPv6) defined in RFC-2460, provides a 128 bit source and destination address fields.

OPENFLOW is a software-defined networking protocol that splits the control plane and the data plane on network switches, and shifts the control plane to a centralized computer (i.e., a controller). Forwarding decisions are made by the controller, rather than a network device (e.g., a switch). The controller provides those decisions to the switch using the OPENFLOW application programming interface as an OPENFLOW flow. The controller is fully aware of the network topology because it communicates with all OPENFLOW enabled devices. The controller is not bound to any network hardware limitations or the software platform of a particular vendor.

SUMMARY

Apparatus and method for routing packets in a computer network are disclosed herein. In one embodiment, a network switch for routing packets in a computer network includes a plurality of ports for communicative connection of computing devices to the switch, and routing logic. The routing logic is configured to extract, from a packet received via a first of the ports, a destination address that identifies a destination device to which the packet is directed; to extract from the destination address a switch ID value and a port ID value; to compare the switch ID value extracted from the destination address to a switch ID value identifying the network switch; and to transmit the packet via a second of the ports of the network switch corresponding to the port ID value based on the switch ID value extracted from the destination address being equal to the switch ID value identifying the network switch.

In another embodiment, a method for routing a packet in a computer network includes receiving, by a network switch, a packet via a first port of the network switch. A destination address that identifies a destination device to which the packet is directed is extracted from the packet by the network switch. From the destination address, the network switch extracts a switch ID value identifying a destination switch to which the destination device is connected, and a port ID value identifying a port of the destination switch to the destination device is connected. The switch ID value extracted from the destination address is compared to a switch ID value identifying the network switch by the network switch. The packet is transmitted, by the network switch, via a second port of the network switch corresponding to the port ID value based on the switch ID value extracted from the destination address being equal to the switch ID value identifying the network switch.

In a further embodiment, a computer network includes a network switch and a plurality of computing devices. The network switch includes a plurality of ports. Each of the computing devices is coupled to one of the ports of the switch. The switch is configured to 1) receive, via a first of the ports, a packet transmitted by one of the computing devices; 2) extract, from a packet, a destination address that identifies a destination device to which the packet is directed; 3) extract from the destination address: a switch ID value identifying a destination switch to which the destination device is connected; and a port ID value identifying a port of the destination switch to the destination device is connected; 4) compare the switch ID value extracted from the destination address to a switch ID value identifying the network switch; and 5) transmit the packet via a second of the ports that corresponding to the port ID value based on the switch ID value extracted from the destination address being equal to the switch ID value identifying the network switch.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
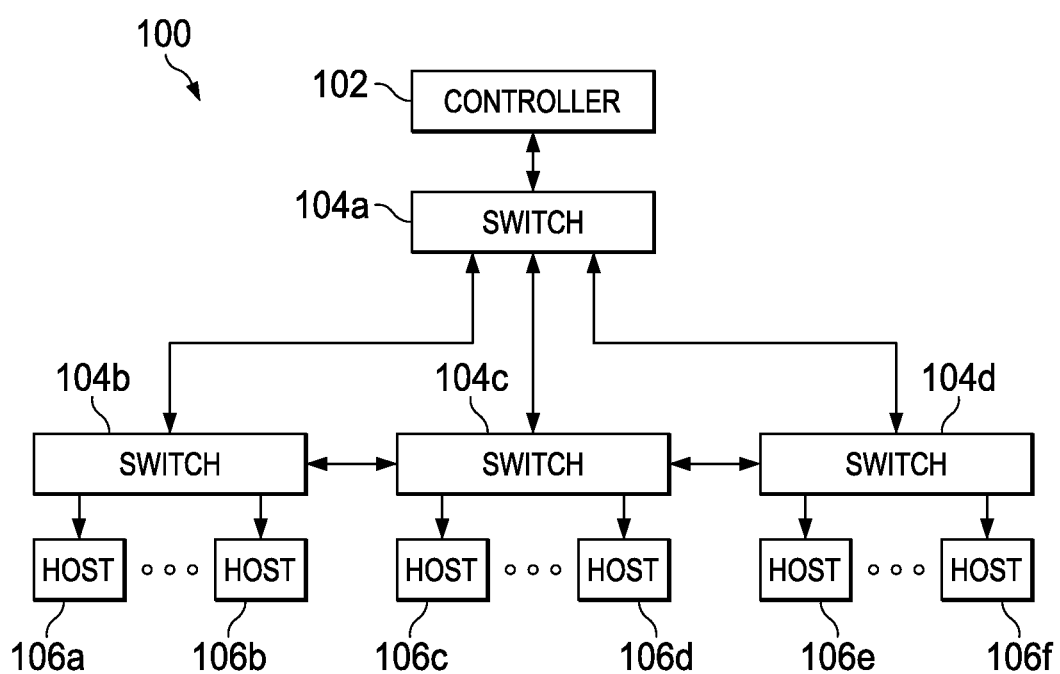
FIG. 1 shows a block diagram of a computer network that applies location-based addressing and routing in accordance with principles disclosed herein.

In the following discussion and in the claims, the terms "including" and "comprising" are used in an open-ended fashion, and thus should be interpreted to mean "including, but not limited to . . . ." In addition, the term "couple" or "couples" is intended to mean either an indirect or a direct connection. Thus, if a first device couples to a second device, that connection may be through a direct connection, or through an indirect connection (e.g., a logical connection) accomplished via other devices and connections. Further, the term "software" includes any executable code capable of running on a processor, regardless of the media used to store the software. Thus, code stored in memory (e.g., non-volatile memory), and sometimes referred to as "embedded firmware," is included within the definition of software. The recitation "based on" is intended to mean "based at least in part on." Therefore, if X is based on Y, X may be based on Y and any number of other factors. The term "routing," and "route" and the like as used herein refer to selecting a path for transfer of data in a network that advances the data towards an ultimate destination. Accordingly, routing may be performed by switches, routers, bridges, gateways, or other network devices.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In conventional computer networks that use Internet Protocol version 4 (IPv4), address resolution protocol (ARP) is used to map each device's media access control (MAC) address to its IP address. ARP employs Ethernet broadcasting. With ARP, all devices listen to ARP requests, and reply to them as appropriate. Processing ARP requests may consume substantial processing power because all ARP requests must be examined. In some operating systems, processing ARP packets take priority over other activities. Internet Protocol version 6 (IPv6) uses the address resolution function in the Neighbor Discovery Protocol (NDP), to find the media access control (MAC) address of an on-link device. Many of the capabilities supplied by NDP are similar to those located in IPv4's ARP.

To avoid routing loops, Ethernet networks employ the Rapid Spanning Tree Protocol (RSTP) to construct a spanning tree of the network before any traffic is routed. Based on the spanning tree, links causing redundant loops are disabled. This can constrain packets to suboptimal routes resulting in reduced network capacity. In data centers, this is particularly problematic where redundancy is often planned to increase bandwidth and throughput. Because use of a spanning tree forces the network towards suboptimal routes, RSTP is often disabled in data centers.

Ethernet also employs and promotes higher-layer protocols that utilize broadcasts to convey control messages. For example, ARP executes address resolution via broadcast queries, and dynamic host configuration protocol (DHCP) anticipates use of broadcasts for automatic configuration. Broadcast traffic in normal conditions may be 2%-5% of network traffic and should not exceed 20% of the total network traffic to avoid broadcast storm and other network failures. It is desirable for the network to minimize the amount of broadcast traffic.

Network routing devices often employ content addressable memory (binary CAM) and TCAMs (ternary content addressable memory) to determine how a received packet should be routed. A CAM is a memory device that implements a lookup-table function in a single clock cycle using dedicated comparison circuitry. CAMs and TCAMs are among the most expensive circuit elements in a network device.

Embodiments of the computer network disclosed herein employ a novel addressing and routing scheme that improves network efficiency by reducing broadcast messages. Additionally, embodiments alleviate the need for CAM entries in network devices, such as network switches, thereby reducing the cost associated with the network device. The networking system of the present disclosure employs an addressing technique that utilizes device connectivity hierarchy to determine the addresses of networked devices. Using the aforementioned addressing technique, the device addresses included in each packet contain information specifying the routing of the packet.

FIG. 1 shows a block diagram of a computer network 100 that applies location-based addressing and routing in accordance with principles disclosed herein. The network 100 includes a controller 102, switches 104 (104A-104D), and host devices 106 (106A-106F). The controller 102 and the switches 104 provide routing services to the host devices 106. The controller 102 is a computing device that configures the switches 106 and the host devices 108 for network data transfer. The controller and the switches may connect using OPENFLOW protocol or other protocols. For example, the controller 102 assigns address values that include location-based routing information to the host devices 108 and the switches 104, and provides routing information to the switches 104 for routing of packets to destinations that are unknown to the switches 104. The controller 102, switches 104, and host devices 106 may be interconnected via a communication medium such electrically or optically conductive cabling.

The switches 104 are computing devices that include a plurality of communication ports. Each port communicatively couples the switch 104 to another device of the network 100, e.g., a host device 106, a switch 104, or the controller 102. The switches 104 extract the location-based routing information from packets transmitted by the host devices 106 and apply the location-based routing information to direct the packet to the appropriate port of the switch 104. The switch 104 may directly apply the location-based routing information to route the packet without referencing additional routing information stored in the switch 104, or consulting the controller 102 for a forwarding decision. Accordingly, the use of CAM in the switches 104 may be reduced or eliminated.

The host devices 106 are computing devices that utilize the routing services provided by the switches 104 and the controller 102 to transfer data between host devices 106. The host devices 106 may be, for example, server computers, desktop computers, laptop computers, wireless network access points, or other computing devices. Similarly, the controller 102 may be embodied in a server computer, a desktop computer, a laptop computer, or other computing device.

Figure 2:
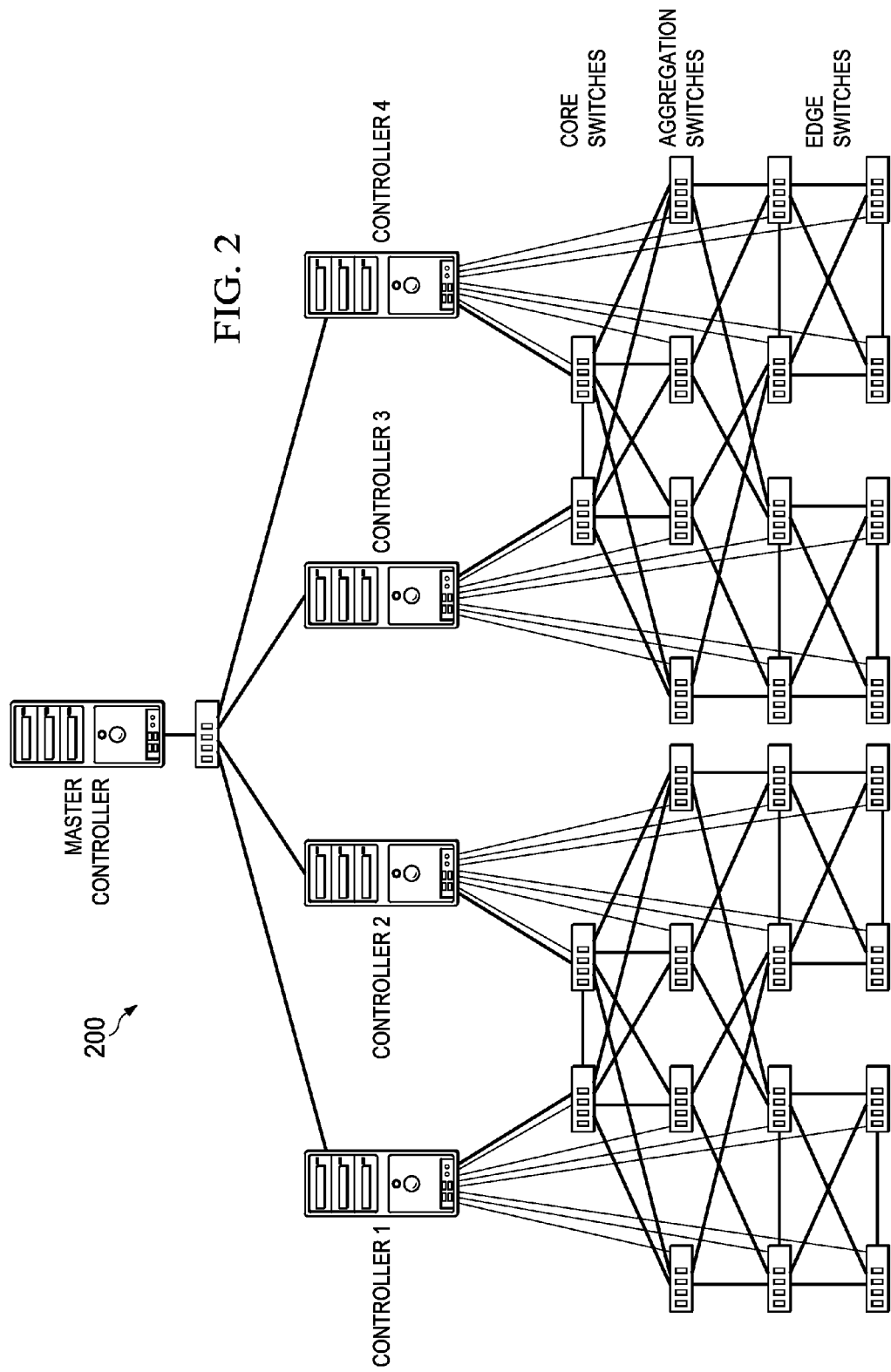
FIG. 2 shows a diagram of a computer network including a switch hierarchy that applies location based addressing and routing in accordance with principles disclosed herein.

While the number of elements shown in the network 100 has been limited to promote clarity, in practice the network 100 may include any number of controllers 102, switches 104, and host devices 106. The switches 104 and controllers 102 of a network may be arranged in a hierarchy. FIG. 2 shows a diagram of a computer network 200 including a switch and controller hierarchy that applies location based addressing and routing in accordance with principles disclosed herein. The network 200, which is an embodiment of the network 100, includes a plurality of controllers, with a master controller communicatively coupled to each of the other controllers by a switch, and a switch hierarchy including core switches, aggregation switches and edge switches. Host devices 106 are omitted from FIG. 2, and, in practice, a number of host devices 106 may be connected to each of the edge switches.

Figure 3:
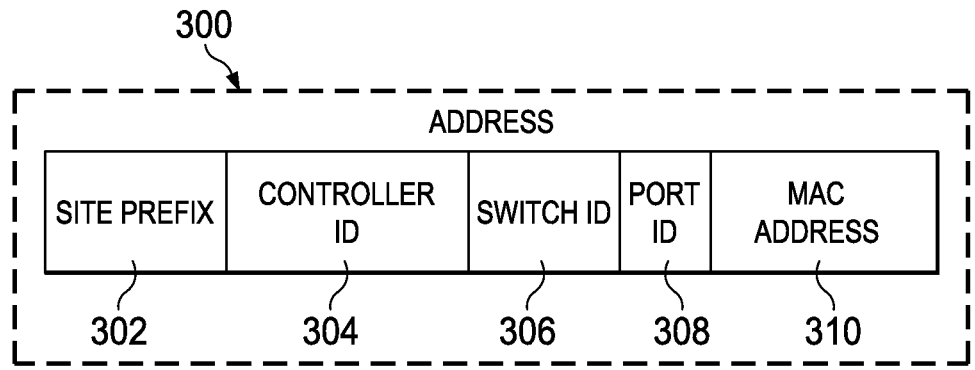
FIG. 3 shows a diagram of an address value for use in location-based addressing and routing in accordance with principles disclosed herein.

Referring again to FIG. 1, in the network 100, when a host device 106 is connected to a port of a switch 104, an address value that includes location-based routing information is assigned to the host device 106. FIG. 3 shows a diagram of an address value 300 that provides location-based addressing and routing in accordance with principles disclosed herein. The address value 300 may be included in packets transmitted by the host devices 106. The address value 300 includes a site prefix field 302, a controller ID field 304, a switch ID field 306, a port ID field 308, and a MAC address field 310. The MAC address field 310 contains the MAC address of the host device 106 (e.g., the MAC address of a destination host device 106). The switch ID field 306 contains a value identifying the switch 104 to which the host device 106 is connected (e.g., the switch to which a destination host device 106 is connected). The port ID field 308 contains a value identifying the specific port, of the switch 104 identified in the switch ID field 306, to which the host device 106 is connected (e.g., the switch port to which a destination host device 106 is connected). The controller ID field 304 contains a value identifying the controller 102 to which the switch 104 identified in the switch ID field 306 is connected. The site prefix field 302 contains a value identifying the site (physical location) where the controller 102 identified in the controller ID field 104 is located. The address value 300 may be referred to as an Embedded Switch number, Port number, MAC address value (ESPM address value) because switch ID, port ID, and MAC address are embedded therein.

The controller 102 identified in the controller ID field 304 may generate and assign an instance of the address value 300 to each host device 106 with which the controller 102 is associated. Similarly, each switch 104 in the network 100 contacts the controller 102 (i.e., the controller 102 to which the switch 104 is most directly connected), and retrieves a switch ID value, controller ID value, and site prefix value from the controller 102. The site prefix value may be assigned by a central authority, where the site prefix value may identify an entity such as a corporation, a university, etc. Similarly, the controller ID values may assigned by a central authority. The controller 106 determines the address 300 of the host 106 based on the location of the host 106 in the routing path: controller to switch, switch to port, and port to host MAC.

Some embodiments of the network 100 apply IP version 6 (IPv6). In such embodiments, the address 300 may be provided in the IP source and/or destination address fields. Accordingly, in embodiments applying IPv6, the address 300 is 128 bits in length. In other embodiments, the address 300 may be longer or shorter than 128 bits. In one embodiment of the address 300, the site prefix field is 40 bits in length, the controller ID field 304 is 10 bits in length, the switch ID field 306 is 20 bits in length, the port ID field 308 is 10 bits in length, and the MAC address field 310 is 48 bits in length. In other embodiments, the address 300, and/or any of the fields 302-310 may differ in length with respect to the lengths specified above.

Each connection of a switch 104 to another switch 104 (known as a trunk port) is also assigned an address by the controller 102 associated to the switches 104. The trunk port address may be of the same form as address value 300, but differ from the address values assigned to host devices 106 in that the MAC address field 310 of a trunk port address may be set to all ones, i.e., FFFF:FFFF:FFFF. The controller and switch ID values embedded in the trunk address assist in providing the path information between different switches 104 or controllers 102.

Figure 4:
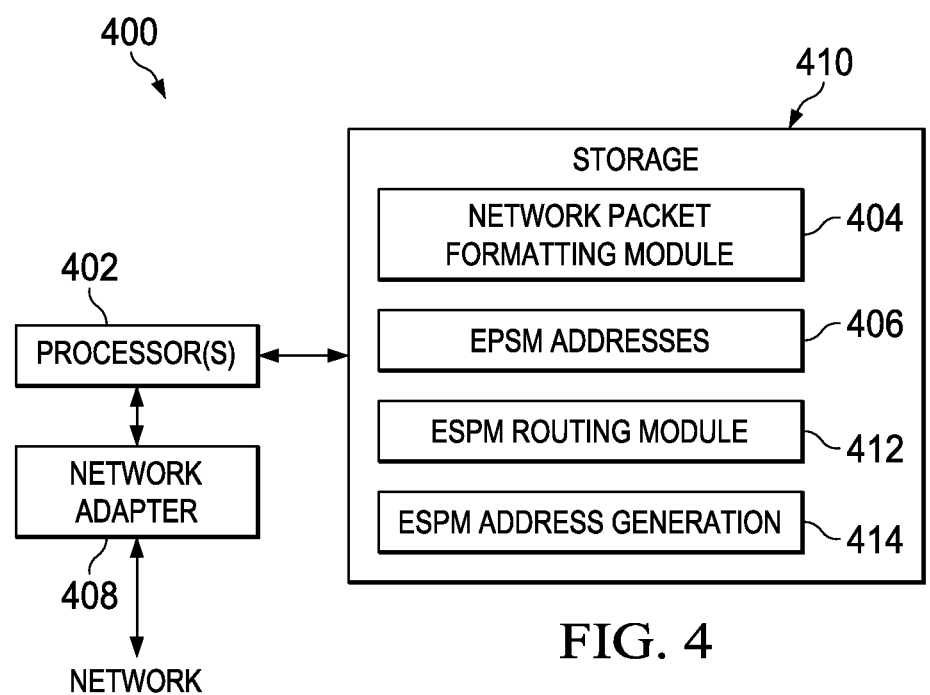
FIG. 4 shows a block diagram of a computing device that includes location-based addressing and routing in accordance with principles disclosed herein.

FIG. 4 shows a block diagram of a computing device 400 that includes location-based addressing and/or routing in accordance with principles disclosed herein. The computing device 400 may be applied as the controller 102, switch 104, or host device 106. Accordingly, embodiments of the computing device 400 may include only the portions described herein that are applicable to operation as a particular one of the controller 102, switch 104, and host device 106.

The computing device 400 includes one or more processors 402, storage 410, and one or more network adapters 408. The processor(s) 402 is an instruction execution device that executes instructions retrieved from the storage 410. Processors suitable for use as the processor(s) 402 may include general-purpose microprocessors, digital signal processors, network processors, microcontrollers, or other devices capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 410 is a non-transitory computer-readable storage medium suitable for storing instructions executable by the processor(s) 402. The storage 410 may include volatile storage such as random access memory, non-volatile storage (e.g., a hard drive, an optical storage device (e.g., CD or DVD), FLASH storage, read-only-memory), or combinations thereof.

The network adapter(s) 408 includes circuitry that connects the computing device 400 to the data transmission medium (e.g., electrically or optically conductive cabling) that interconnects the controllers 102, switches 104, and host devices 106. The network adapter(s) 408 allow the computing device 400 to receive and transmit data packets via the interconnecting transmission medium.

The storage 402 contains software instructions that when executed cause the processor(s) 402 to perform the location-based routing operations disclosed herein. The ESPM addresses 406 may include address values 300 for a host device 106, a trunk port, etc. The network packet formatting module 404 may include instructions that when executed cause the processor(s) 402 to generate packets for transmission that include source and/or destination address values read from the ESPM addresses 406 as disclosed herein. The ESPM routing module 412 may include instructions that when executed cause the processor(s) 402 to route a received packet through the network 100 based on the location information contained in the ESPM addresses provided in the destination field of the packet as disclosed herein. The ESPM address generation module 414 may include instructions that when executed cause the processor(s) 402 to generate and assign address values 300 for a host device 106 or a trunk port as disclosed herein.

Embodiments of the computing device 400 may include other components and subsystems that have been omitted from FIG. 4 in the interest of clarity. For example, in embodiments of the computing device 400 applied as a switch 104, the storage 410 may include content addressable memory, such as tertiary content addressable memory (TCAM). In general, the computing device 400 may also include power supplies, user interfaces, etc.

In routing packets between host devices 106, when a switch 104 receives a packet from a host device 106, if the destination address value 300 specifies a different controller ID domain than that to which the switch 106 belongs, then the switch 104 employs a trunk port to forward the packet based on flow settings in the switch 106. If no flow entry exists for the controller domain specified in the address 300, then the switch 104 forwards the packet to the controller 102. Within a site, controllers 102 have full knowledge of the topology and trunk ports on the switches 104. However, the trunk port definition for the network 100 also holds true for multi-site connections where an edge switch of a site may connect to another edge switch of another site and their port addresses will reflect the site ID differences.

More specifically, a local controller 102 will learn and create a neighbor table. A neighbor table records and maps the ports of every switch 104 to its adjacent and physically connected switches 104. The exemplary neighbor table below shows connections for a first of two controllers that are each connected to three switches, and all switches are connected to the first 3 ports.

| Switch ID | Port 1 | Port 2 | Port 3 |
|---|---|---|---|
| Switch 1 | Switch 2 | Switch 3 | Switch 1 (Controller 2) |
| Switch 2 | Switch 1 | Switch 2 (Controller 2) | Switch 3 |
| Switch 3 | Switch 1 | Switch2 | Switch 3 (Controller 2) |

Figure 5:
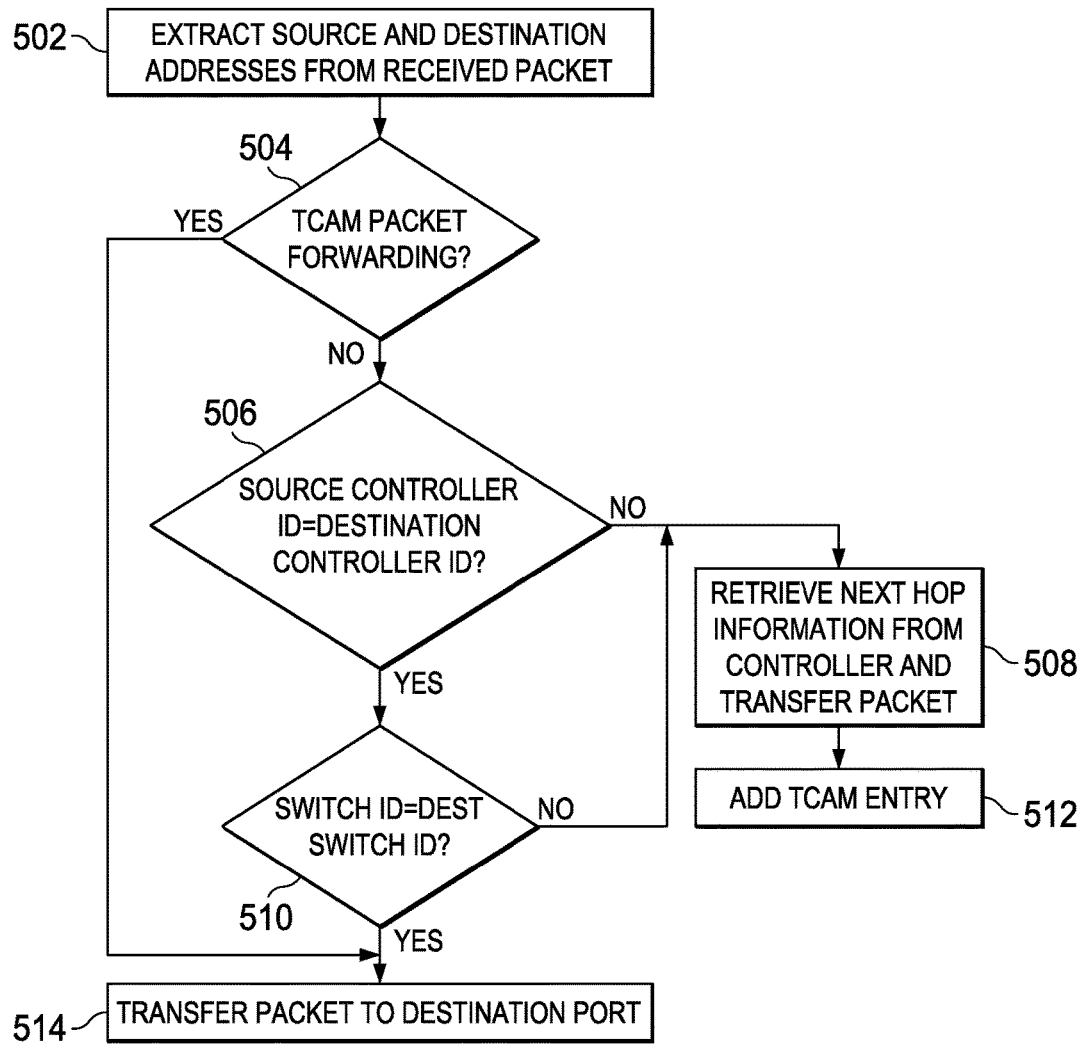
FIG. 5 shows a flow diagram for a method for location-based routing in a computer network accordance with principles disclosed herein.

FIG. 5 shows a flow diagram for a method 500 for location-based routing in accordance with principles disclosed herein. Though depicted sequentially as a matter of convenience, at least some of the actions shown can be performed in a different order and/or performed in parallel. Additionally, some embodiments may perform only some of the actions shown. In some embodiments, at least some of the operations of the method 500, as well as other operations described herein, can be implemented as instructions stored in computer readable medium 410 and executed by the processor(s) 402.

In block 502, a switch 104 receives a packet from a host device 106. The packet includes a source address 300 and a destination address 300. The switch 104 extracts the source and destination addresses from the received packet.

In block 504, the switch 104 checks its TCAM table for an entry to process the received packet. If an entry is found in the TCAM table, the switch transfers the packet to a specified port and the packet is forwarded towards the destination specified by the destination address 300 in block 514. Forwarding the packet towards the destination specified by the destination address 300 may include forwarding the packet to a port that connects the switch 104 to different switch that is closer to the packet's ultimate destination.

If no TCAM table entry is found, then, in block 506, the switch 104 inspects the source and destination controller ID values contained in the source and destination addresses 300. If the source and destination controller ID values differ, then the switch 104 passes the addresses 300 to the controller 102 in block 508. The controller 102 determines how the packet should be routed in the next hop towards the destination, and informs the switch 104. The switch 104 transfers the packet to a port specified by the controller 102, and the packet is forwarded towards the destination specified by the destination address 300. The switch 104 adds an entry corresponding to the destination to the TCAM table.

If the source and destination controller ID values are the same, then, in block 510, the switch 104 inspects the destination switch ID values contained in the destination address 300. If the ID of the switch 104 and the destination switch ID values differ, then the switch 104 passes the addresses 300 to the controller 102 in block 508. The controller 102 determines how the packet should be routed in the next hop towards the destination, and informs the switch 104. The switch 104 transfers the packet to a port specified by the controller 102, and the packet is forwarded towards the destination specified by the destination address 300. The switch 104 adds an entry corresponding to the destination to the TCAM table.

If the switch ID values are the same, then, in block 514, the switch 104 transfers the packet to a port specified by the port ID value contained in the destination address 300, and the packet is forwarded to the destination host device 106.

Operations similar those the method 500 may be performed with regard to each switch 104 through which the packet passes as it is routed from the source host 106 to the destination host 106. In such operations, each switch compares the controller ID, switch ID and/or site prefix assigned to the switch to the corresponding values extracted from the packet destination address.

Routing operations in the system 100 may also be described by the following pseudo-code.

```
IF TCAM table can forward the destination packet
    THEN Send to Destination port number
ENDIF
While controller ID != switch controller ID
    Check local controller for next switch hop
    Add new TCAM entry and send to next switch.
    IF TCAM forwards the packet
    THEN Send to Destination port number
    ENDIF
(Given the destination controller ID and switch ID, setup a flow to assign an output port.)
While destination switch ID != Switch ID
    Check local controller for next switch hop
    Add a new TCAM entry and send to next switch.
@Next switch, forward to the port number embedded in the destination address
Check and verify MAC address for the host
```

The network 100 supports multicasting using addresses 300 that start with ff00 to define the multicast range for groups. This range (ff00::00 to ff00: ffff:ffff:ffff:ffff:ffff:ffff) provides 16.7 million groups on every enterprise. Since any device in the enterprise network can be a multicast group member, the network 100 maps multicast groups to a designated server that will manage multicast groups on the site. Controllers 102 forward all multicast join requests to the designated server, where the multicast groups will be created. When a device 106 sends a multicast message to its multicast group, the message is forwarded to the multicast-server and the multicast server contacts the controllers 102 to disseminate the message to multicast group members.

To broadcast a message on the network 100, the multicast group FF02::1 is used, and every host device 106 of the network 100 joins the group by default. To send a broadcast message, the message destination address is set to FF02::1. To send a broadcast to all ports of a switch 104, the destination port ID is set to all ones. To send a broadcast to all switches 104 on a controller 102, the destination switch ID is set to all ones. To send a broadcast to all switches of a site, the destination controller ID is set to all ones.

Figure 6:
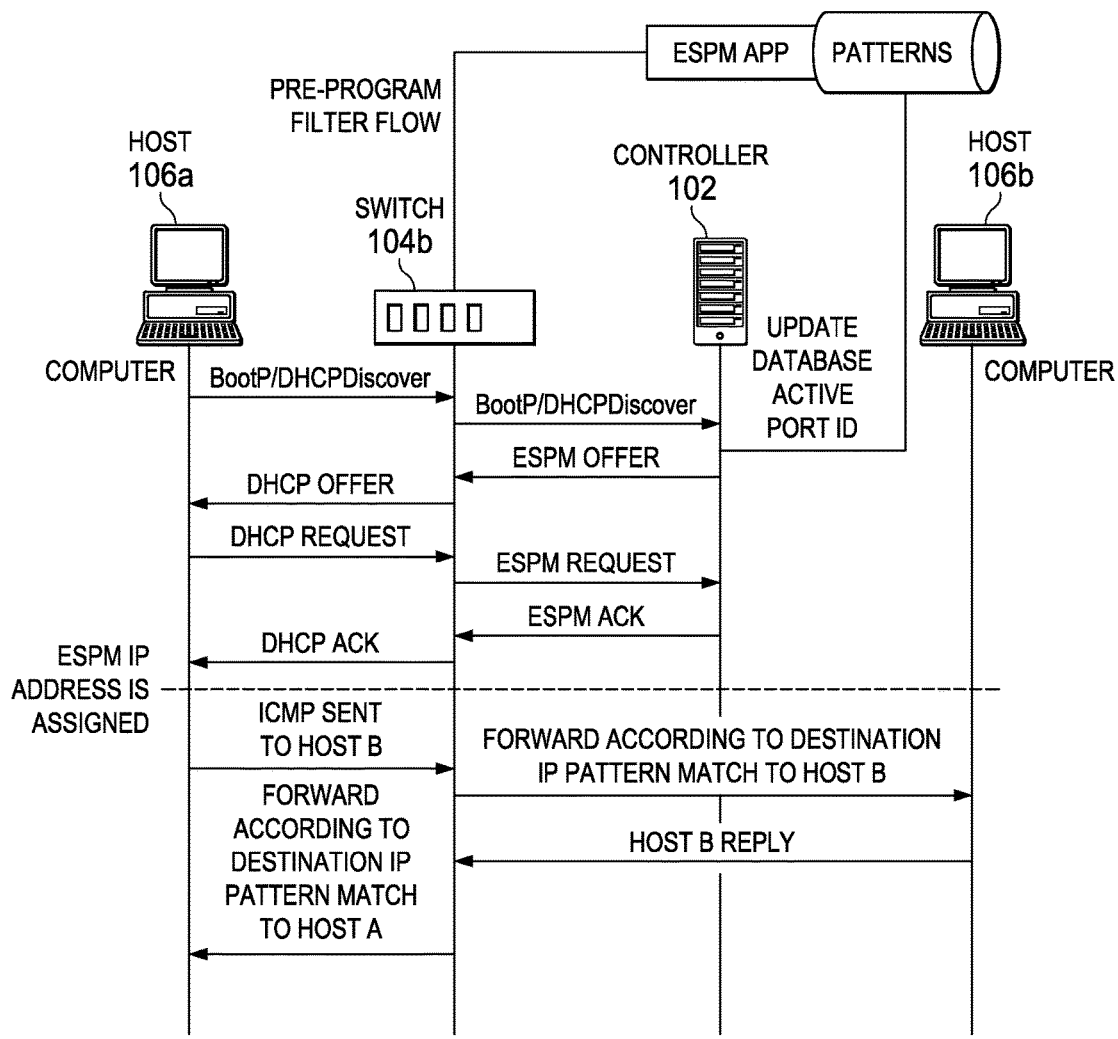
FIGS. 6 and 7 show information flow for routing using location-based addressing in accordance with principles disclosed herein.
Figure 7:
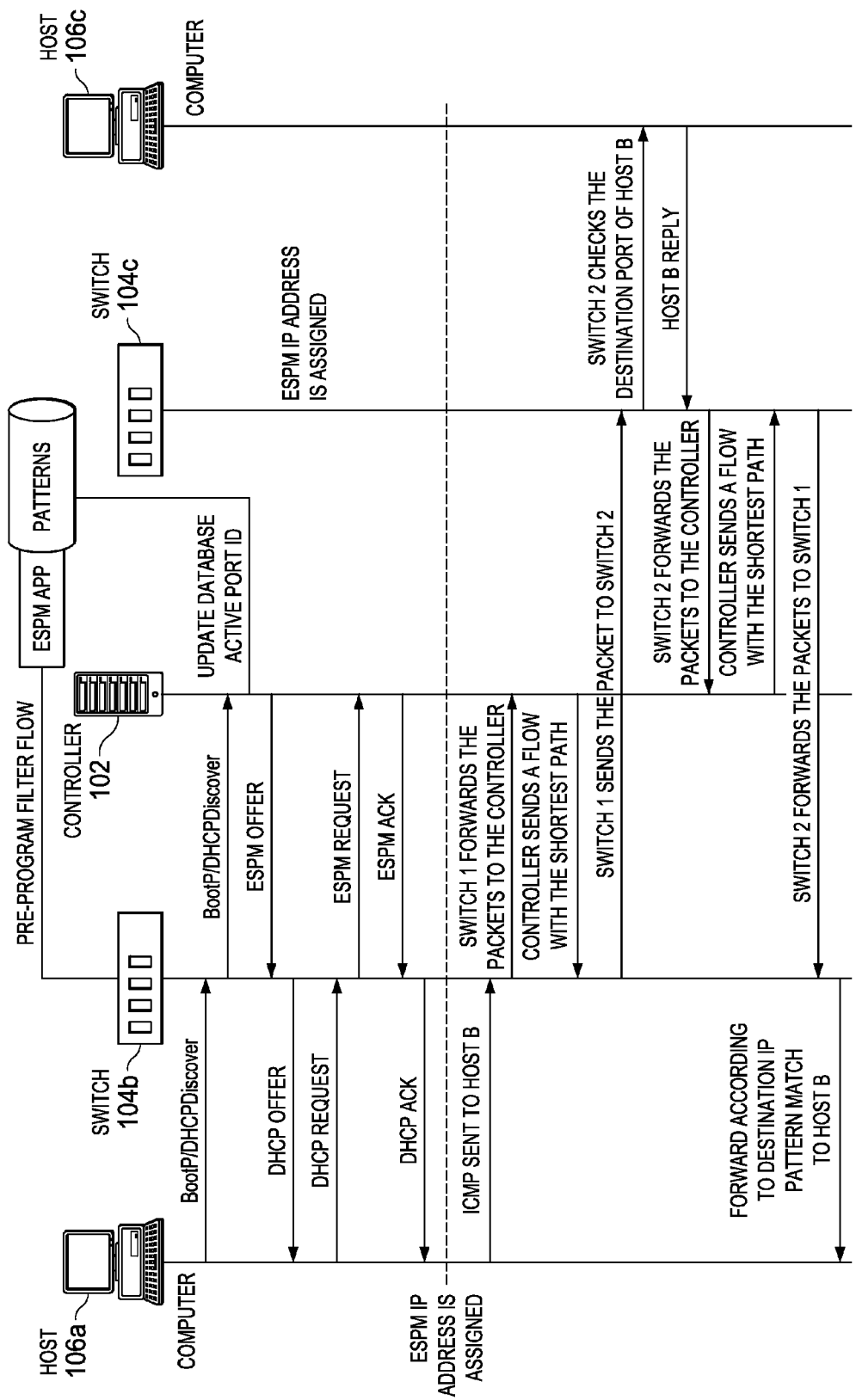

FIGS. 6 and 7 show information flow for routing using location-based addressing in accordance with principles disclosed herein. In FIG. 6, routing is between two host devices 106 via a single switch 104. For example, routing may be between host 106A and host 106B via switch 104B. When each host device 106 joins the network 100, a bootstrap protocol is executed. The Bootp/DHCP "discover" packet is forwarded to the controller 102 automatically because the switch 104 is pre-programmed with a flow entry for such packets by the controller 102. The DHCP packet from the switch 104 invokes the ESPM address generation functionality of the controller 102. The controller 102 replies to the switch 104 with an address 300 to be assigned to the host 106. The switch 104 sends a "DHCP OFFER" packet that contains the address 300 to the host 106. The DHCP process continues with the host 106 sending a confirmation "DHCP request" with the assigned address 300 to the switch 104. All such DHCP messages are pre-programmed to be sent to the controller 102 by the switch 104. Therefore, the controller 102 will send a "DHCP ACK" back to the switch 104. The switch 104 will send the DHCP ACK packet to the host 106, completing the DHCP-based assignment of the ESPM address value 300.

After address assignment, host 106A transmits a packet to host 106B, and the destination address value 300 of the packet is analyzed by the switch 104B. Because source and destination addresses 300 contained in the packet include the same Site ID, Controller ID, and Switch ID values, the switch 104B will extract the port ID value from the destination address 300 and forward the packet to the port corresponding the extracted port ID value. Thus, the packet flows directly between host 106A and host 106B. No ARP or NDP messages are exchanged. Routing of a response from host 106B to host 106A proceeds according to a similar sequence of operations.

In FIG. 7, routing is between two host devices 106 via two switches 104. For example, routing may be between host 106A and host 106C via switches 104B and 104C. Host device 106A joins the network 100 as described with respect to FIG. 6.

After an address has been assigned to host 106A, host 106A transmits a packet to host 106C, and the destination address value 300 of the packet is analyzed by the switch 104B. If the switch 104B is unable to identify a route to the switch 104C (designated in the destination address 300), then the switch 104B sends the packet to the controller 102. The controller 102 inspects the destination's controller ID and Switch ID, check the neighbors table, and calculates the shortest path to the destination (e.g., according to the Dijkstra algorithm). The controller 102 sends routing information to the switch 104B, and the information is cached as an entry in the flow table of the switch 104B. Additional incoming packets that match this flow will be forwarded without consulting the controller 102.

In accordance with the routing information received from the controller 102, switch 104B forwards the packet to switch 104C which also checks the controller ID and switch ID in the destination address 300. Because destination address 300 contained in the packet include the same site ID, controller ID, and switch ID values as the switch 104C, the switch 104C extracts the port ID value from the destination address 300 and forwards the packet to the port corresponding to the extracted port ID value. Routing of a response from host 106C to host 106A proceeds according to a similar operation sequence.

Embodiments of the switch 104 check a TCAM table to determine whether the packet can be forwarded based on a TCAM entry. If the packet cannot be forwarded based on a TCAM entry, then the switch 104 inspects the incoming packet to determine whether the destination host is on the same controller and switch IDs as the switch 104, if so the switch 104 can forward the packet to the destination without adding a new entry to the forwarding table (CAM table). If the destination host is not on the switch 104, the controller 102 will add a flow to the switch 104, with the specified match/action fields. The inserted flow will be represented in the TCAM table as a new entry. Accordingly, the routing techniques employed by the network 100 can provide a substantial reduction in the size of the forwarding table, by removing the need for a CAM table and applying routing as disclosed herein.

Routing of packets in the network 100 requires substantially less network traffic than in a conventional network due to the decreased number of packets that will be sent to all hosts on the network (Broadcast). Analysis of the routing of network 100 as exemplified in FIGS. 6 and 7 respectively show at least 28% and 44% fewer packets transferred than in network employing conventional routing.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A network switch for routing packets in a computer network, comprising:
   a plurality of ports for communicative connection of computing devices to the network switch; and
   routing logic configured to:
      extract, from a packet received via a first of the plurality of ports, a destination address that identifies a destination device to which the packet is directed, wherein the destination address identifies the destination device by specifying, within the destination address, a device connectivity hierarchy that identifies a plurality of network devices that are hierarchically connected to the destination device;
      apply the destination address to route the packet without referencing routing information not provided in the destination address, in routing the packet to:
      extract from the destination address:
         a switch ID value identifying a destination switch to which the destination device is connected; and
         a port ID value identifying a port, of the destination switch, to the destination device is connected;
      compare the switch ID value extracted from the destination address to a switch ID value identifying the network switch; and
      transmit the packet via a second of the plurality of ports of the network switch corresponding to the port ID value based on the switch ID value extracted from the destination address being equal to the switch ID value identifying the network switch.

2. The network switch of claim 1, wherein the routing logic is configured to:
  extract from the destination address a site prefix value that identifies a physical location of the destination device;
  compare the site prefix value extracted from the destination address to a site prefix value identifying a physical location of the network switch; and
  transmit the packet via the second of the ports based on the site prefix value extracted from the destination address being equal to the site prefix value identifying the physical location of the network switch.

3. The network switch of claim 1, wherein the routing logic is configured to:
  extract from the destination address a controller ID value that identifies a controller to which the destination switch is connected;
  compare the controller ID value extracted from the destination address to a controller ID value identifying a controller to which the network switch is connected; and
  transmit the packet via the second of the ports based on the controller ID value extracted from the destination address being equal to the controller ID value identifying the controller to which the network switch is connected.

4. The network switch of claim 1, wherein the routing logic is configured to:
  retrieve routing information from a controller to which the network switch is connected via the network based on the switch ID value extracted from the destination address not being equal to the switch ID value identifying the network switch;
  store the retrieved routing information in a routing table of the network switch; and
  apply the routing information to route the packet to the destination device.

5. The network switch of claim 1, wherein the routing logic is configured to:
  access a routing table of the network switch to determine whether routing information for the destination address is stored in the routing table; and
  route the packet to the destination device based on the routing information for the destination device stored in the routing table.

6. The network switch of claim 1, further comprising a content addressable memory configured to store routing information; wherein the routing logic is configured to route the packet to the destination device without retrieving routing information from the content addressable memory.

7. The network switch of claim 1, wherein the routing logic is configured to retrieve from a controller to which the network switch is connected: the switch ID value identifying the network switch, a site prefix value that identifies a physical location of the network switch, and a controller ID value that identifies a controller to which the network switch is connected.

8. A method for routing a packet in a computer network, comprising:
  receiving, by a network switch, a packet via a first port of the network switch;
  extracting, from the packet, by the network switch, a destination address that identifies a destination device to which the packet is directed, wherein the destination address identifies the destination device by specifying, within the destination address, a device connectivity hierarchy that identifies a plurality of network devices that are hierarchically connected to the destination device;
  applying, by the network switch, the destination address to route the packet without referencing routing information not provided in the destination address, the routing comprising:
    extracting, by the network switch, from the destination address:
      a switch ID value identifying a destination switch to which the destination device is connected; and
      a port ID value identifying a port of the destination switch to the destination device is connected;
    comparing, by the network switch, the switch ID value extracted from the destination address to a switch ID value identifying the network switch; and
    transmitting, by the network switch, the packet via a second port of the network switch corresponding to the port ID value based on the switch ID value extracted from the destination address being equal to the switch ID value identifying the network switch.

9. The method of claim 8, further comprising:
  extracting from the destination address:
    a site prefix value that identifies a physical location of the destination device; and
    a controller ID value that identifies a controller to which the destination switch is connected;
  comparing the site prefix value extracted from the destination address to a site prefix value identifying a physical location of the network switch;
  comparing the controller ID value extracted from the destination address to a controller ID value identifying a controller to which the network switch is connected; and
  transmitting the packet via the second port based on the site prefix value extracted from the destination address being equal to the site prefix value identifying the physical location of the network switch, and the controller ID value extracted from the destination address being equal to the controller ID value identifying the controller to which the network switch is connected.

10. The method of claim 8, further comprising:
  retrieving routing information for the destination address from a controller to which the network switch is connected via the network responsive to the switch ID value extracted from the destination address not being equal to the switch ID value identifying the network switch; and
  storing the retrieved routing information in a routing table of the network switch.

11. The method of claim 8, further comprising:
  accessing a routing table of the network switch to determine whether routing information for the destination address is stored in the routing table;
  routing the packet to the destination device based on the routing information for the destination device stored in the routing table; and
  retrieving routing information from a controller to which the network switch is connected via the network responsive to the routing table lacking routing information for the destination address.

12. The method of claim 8, further comprising:
  for each of a plurality of computing devices connected to the network switch via the network:
    constructing, by a controller connected to the network switch, via the network, an address comprising:

a site prefix value that identifies a physical location of the controller generating the address;
a controller ID value that identifies the controller generating the address;
a switch ID value identifying the network switch;
a port ID value identifying a port, of the network switch to which the computing device is connected, to which the computing devices is connected; and
a medium access controller address of the computing device; and
transmitting the address to the computing device via the network.

13. The method of claim 8, further comprising:
for each switch connected to a controller via the network:
constructing, by the controller, location based addressing information comprising:
a site prefix value that identifies a physical location of the controller generating the address;
a controller ID value that identifies the controller generating the address; and
a switch ID value identifying the switch; and
transmitting the addressing information to the switch via the network.

14. The method of claim 8, further comprising routing the packet to the destination device without retrieving routing information from a content addressable memory of the network router.

15. A computer network, comprising:
a network switch comprising a plurality of ports; and
a plurality of computing devices, each of the computing devices coupled to one of the plurality of ports of the switch;
wherein the network switch is configured to:
receive, via a first of the plurality of ports, a packet transmitted by one of the computing devices;
extract, from a packet, a destination address that identifies a destination device to which the packet is directed, wherein the destination address identifies the destination device by specifying, within the destination address, a device connectivity hierarchy that identifies a plurality of network devices that are hierarchically connected to the destination device;
apply the destination address to route the packet without referencing routing information not provided in the destination address, in routing the packet to:
extract from the destination address:
a switch ID value identifying a destination switch to which the destination device is connected; and
a port ID value identifying a port of the destination switch to the destination device is connected;
compare the switch ID value extracted from the destination address to a switch ID value identifying the network switch; and
transmit the packet via a second of the plurality of ports that corresponding to the port ID value based on the switch ID value extracted from the destination address being equal to the switch ID value identifying the network switch.

16. The computer system of claim 15, wherein the switch is configured to:
extract from the destination address:
a site prefix value that identifies a physical location of the destination device; and
a controller ID value that identifies a controller to which the destination switch is connected;
compare the site prefix value extracted from the destination address to a site prefix value identifying a physical location of the network switch;
compare the controller ID value extracted from the destination address to a controller ID value identifying a controller to which the network switch is connected; and
transmit the packet via the second of the ports based on the site prefix value extracted from the destination address being equal to the site prefix value identifying the physical location of the network switch, and the controller ID value extracted from the destination address being equal to the controller ID value identifying the controller to which the network switch is connected.

17. The computer system of claim 15, further comprising:
a controller connected to the switch via the network, the controller configured to, for each of the plurality of computing devices:
construct an address comprising:
a site prefix value that identifies a physical location of the controller generating the address;
a controller ID value that identifies the controller generating the address;
a switch ID value identifying the network switch;
a port ID value identifying a port, of the network switch to which the computing device is connected, to which the computing devices is connected; and
a medium access controller address of the computing device; and
transmit the address to the computing device via the network.

18. The computer system of claim 15, wherein each of the computing devices is configured to include in each packet transmitted via the network:
a location based source address comprising:
a site prefix value that identifies a physical location of the computing device transmitting the packet;
a controller ID value that identifies a controller that generated the location based source address;
a switch ID value identifying a switch to which the computing device transmitting the packet is connected;
a port ID value identifying a port, of the switch to which the computing device transmitting the packet is connected, to which the computing device is connected; and
a medium access controller address of the computing device; and
a location based destination address comprising:
a site prefix value that identifies a physical location of a computing device to receive the packet;
a controller ID value that identifies a controller that generated the location based destination address;
a switch ID value identifying a switch to which the computing device to receive the packet is connected;
a port ID value identifying a port, of the switch to which the computing device to receive the packet is connected, to which the computing device to receive the packet is connected; and
a medium access controller address of the computing device to receive the packet.

19. The computer system of claim 15, wherein the switch is configured to:
retrieve routing information from a controller to which the network switch is connected via the network based on the switch ID value extracted from the destination address not being equal to the switch ID value identifying the network switch; and store the retrieved routing information in a routing table of the network switch.

20. The computer system of claim 15, wherein the network switch comprises a content addressable memory configured to store routing information, and the network switch is configured to route the packet to the destination device without retrieving routing information from the content addressable memory.

* * * * *